United States Patent
Han (10) Patent No.: US 9,137,452 B2
(45) Date of Patent: Sep. 15, 2015

(54) IMAGE SENSOR AND METHOD OF GENERATING BINNING IMAGE USING THE SAME

(71) Applicant: Yong In Han, Bucheon-si (KR)

(72) Inventor: Yong In Han, Bucheon-si (KR)

(73) Assignee: Dongbu HiTek Co., Ltd., Bucheon-si (KR)

( * ) Notice: Subject to any disclaimer, the term of this patent is extended or adjusted under 35 U.S.C. 154(b) by 29 days.

(21) Appl. No.: 13/827,875

(22) Filed: Mar. 14, 2013

(65) Prior Publication Data
US 2014/0218567 A1 Aug. 7, 2014

(30) Foreign Application Priority Data
Feb. 4, 2013 (KR) .......................... 10-2013-0012259

(51) Int. Cl.
| | |
|---|---|
| *H04N 5/235* | (2006.01) |
| *H04N 5/345* | (2011.01) |
| *H04N 5/347* | (2011.01) |
| *H04N 5/355* | (2011.01) |
| *H04N 9/04* | (2006.01) |

(52) U.S. Cl.
CPC ........... *H04N 5/2353* (2013.01); *H04N 5/2355* (2013.01); *H04N 5/347* (2013.01); *H04N 5/3458* (2013.01); *H04N 5/35554* (2013.01); *H04N 9/045* (2013.01)

(58) Field of Classification Search
CPC ... H04N 5/2353; H04N 5/2355; H04N 9/045; H04N 5/35554; H04N 5/3458; H04N 5/347
See application file for complete search history.

(56) References Cited

U.S. PATENT DOCUMENTS

| | | | | |
|---|---|---|---|---|
| 5,852,468 | A * | 12/1998 | Okada | 348/272 |
| 7,777,804 | B2 | 8/2010 | Shan et al. | |
| 8,144,221 | B2 | 3/2012 | Hiromichi et al. | |
| 2004/0095486 | A1* | 5/2004 | Yamamoto et al. | 348/240.2 |
| 2008/0180547 | A1* | 7/2008 | Hirose | 348/229.1 |
| 2008/0247671 | A1* | 10/2008 | Yasuma et al. | 382/300 |

(Continued)

FOREIGN PATENT DOCUMENTS

| | | |
|---|---|---|
| KR | 10-2007-0099238 A | 10/2007 |
| KR | 10-2009-0035204 A | 4/2009 |
| KR | 10-2010-0086987 | 8/2010 |

OTHER PUBLICATIONS

Abstract for KR 10-2007-0099238; http://kpa.kipris.or.kr; Sep. 10, 2007.

(Continued)

*Primary Examiner* — Jason Flohre
(74) *Attorney, Agent, or Firm* — Andrew D. Fortney; Central California IP Group, P.C.

(57) ABSTRACT

An image sensor includes a pixel unit configured to output a bayer pattern by converting an optical signal of a subject into an electrical signal; and a vertical interpolation unit configured to generate a vertical binning image by adding or averaging values of vertical pixels of the bayer pattern based on weight information set for each row region of the bayer pattern. Further, the image sensor includes a horizontal interpolation unit configured to generate a horizontal binning image by adding or averaging values of horizontal pixels of the bayer pattern based on weight information set for each column region of the bayer pattern; and an image composition unit configured to generate a weight-based binning image by composing the vertical and horizontal binning images.

7 Claims, 5 Drawing Sheets

(56) References Cited

U.S. PATENT DOCUMENTS

| | | | |
|---|---|---|---|
| 2009/0091647 A1 | 4/2009 | Hiromichi et al. | |
| 2009/0109306 A1 | 4/2009 | Shan et al. | |
| 2010/0265352 A1* | 10/2010 | Nashizawa | 348/222.1 |
| 2012/0194720 A1* | 8/2012 | Bowers | 348/302 |
| 2012/0307120 A1* | 12/2012 | Ito et al. | 348/302 |
| 2012/0314107 A1* | 12/2012 | Kanemitsu et al. | 348/246 |
| 2013/0010153 A1* | 1/2013 | Kasai | 348/222.1 |

OTHER PUBLICATIONS

Abstract for KR 10-2009-0035204; http://kpa.kipris.or.kr; Sep. 4, 2009.

Abstract for KR 10-2010-7009042; http://engpat.kipris.or.kr; Oct. 14, 2013.

* cited by examiner

IMAGE SENSOR AND METHOD OF GENERATING BINNING IMAGE USING THE SAME

The present application claims priority to Korean Patent Application No. 10-2013-0012259, filed on Feb. 4, 2013, which is incorporated herein by reference in its entirety.

FIELD OF THE INVENTION

The present invention relates to an image sensor, and more particularly, to an image sensor capable of improving resolution of an image through weight-based binning and a method of generating a binning image using the same.

BACKGROUND OF THE INVENTION

One of the most desired qualities of an image sensor is high sensitivity. A high-sensitive sensor may obtain high-quality images even in a dark state, and may also obtain relatively high-quality images even though a frame rate is increased to capture images of fast-moving objects.

A binning technique is typically adopted for a high-sensitive sensor. Basically, a high-quality and high-sensitive image is obtained by adding values of adjacent pixels according to the binning technique. A binning operation may be implemented as an operation of adding signal values of adjacent pixels by adding accumulated charges in pixels, or may be implemented as an operation of adding analog output values of pixels in a column circuit. Alternatively, the binning operation may be performed in a digital image processing unit.

In general, according to the binning technique using a bayer pattern, by adding or averaging two or more pixels of the same color in a bayer image step, resolution of a screen is decreased, and an SNR is improved.

Hereinafter, a conventional binning technique will be described with reference to the accompanying drawings.

In a 2:1 binning technique typically used in an image sensor using a bayer pattern, a bayer pattern is received, pixels having the same colors are paired in vertical and horizontal directions, and values of the pixels are added or averaged at a ratio of 1:1 to determine values of the pixels, thereby obtaining vertical and horizontal binning images. Then, by using the binning images, a modified image, in which pixels are not uniformly arranged but cluster, is obtained.

Positions of pixels obtained through the above-described process may be compared with those of pixels obtained through ideal sampling assumed in a generally used demosaicing technique. Here, according to the demosaicing technique, the whole RGB colors are restored for the whole pixels from a bayer pattern image in which only one color value from among RGB is assigned to one pixel.

An image obtained through a general scaling technique after applying the demosaicing technique, without performing the binning technique, is excellent in terms of image quality as illustrated in FIG. 3A. However, since a size is reduced after performing an ISP process with an original image, power consumption increases.

In the case of applying the demosaicing technique after performing the binning technique, an inclined edge of an binning image, such as a branch of a tree, is roughly represented, i.e. a jagged edge phenomenon occurs. This phenomenon occurs since sampling positions are irregularly changed due to binning.

To overcome the above-mentioned limitation, a correction filter for correcting sampling positions is used before applying the demosaicing technique after performing binning. As a result, the jagged edge phenomenon is reduced through the correction filter, but resolution of a screen is degraded.

SUMMARY

In view of the above, the present invention provides an image sensor capable of improving resolution of an image and a binning image generating method using the same.

Further, the present invention provides an image sensor capable of expanding a dynamic range through linear correction after performing a weight-based binning operation and a binning image generating method using the same.

An object of the present invention is not limited as mentioned above, other objects may be clearly understood by those skilled in the art from the disclosure below.

In accordance with a first aspect of the present invention, there is provided an image sensor including: a pixel unit configured to output a bayer pattern by converting an optical signal of a subject into an electrical signal; a vertical interpolation unit configured to generate a vertical binning image by adding or averaging values of vertical pixels of the bayer pattern based on weight information set for each row region of the bayer pattern; a horizontal interpolation unit configured to generate a horizontal binning image by adding or averaging values of horizontal pixels of the bayer pattern based on weight information set for each column region of the bayer pattern; and an image composition unit configured to generate a weight-based binning image by composing the vertical and horizontal binning images.

Further, in the bayer pattern of the pixel unit, red pixels and green pixels may be alternately arranged in one row, and blue pixels and green pixels may be alternately arranged in a next row.

The image sensor may further comprise a weight setting unit configured to provide an interface for setting a weight for each row region or each column region of the bayer pattern, and provide the weight set through the interface to the vertical or horizontal interpolation unit.

Further, the weight setting unit may set the weight such that one row and a next row of the row or column region have a ratio of 1:3 or 3:1.

In accordance with a second aspect of the present invention, there is provided an image sensor including: an exposure time control unit configured to control exposure time of each row region and each column region based on a weight set for each row region and each column region; a pixel unit configured to output a bayer pattern according to the exposure time; a vertical interpolation unit configured to generate a vertical binning image by adding or averaging values of vertical pixels in the bayer pattern; a horizontal interpolation unit configured to generate a horizontal binning image by adding or averaging values of horizontal pixels in the bayer pattern; and an image composition unit configured to generate a weight-based binning image by composing the vertical and horizontal binning images.

The image sensor may further comprise an exposure unit configured to expose each pixel in the pixel unit according to the exposure time set by the exposure time control unit.

Further, the image sensor may further comprise a linear correction unit configured to generate a corrected horizontal binning image by correcting a value of each pixel in the vertical binning image through comparison between a pixel value of the vertical binning image and a preset value.

Further, the preset value may be determined according to a maximal pixel value of the pixel unit.

Further, the linear correction unit may correct a pixel value of the vertical binning image by using the maximal pixel value of the pixel unit if the pixel value of the vertical binning image is equal to or greater than the preset value, or, otherwise, maintain the pixel value of the vertical binning image.

Further, the weight setting unit may set the weight for each row region or each column region based on illuminance information for each row region or each column region.

In accordance with a third aspect of the present invention, there is provided a method of generating a binning image of an image sensor, the method including: setting exposure time for each row region or each column region based on a weight set for each row region or each column region; receiving, from pixels, a bayer pattern having different exposure times according to the set exposure time; generating a vertical binning image by adding or averaging values of vertical two pixels having the same color in the bayer pattern; generating a horizontal binning image by adding or averaging values of horizontal two pixels having the same color in the bayer pattern; and generating a weight-based binning image by using the vertical and horizontal binning images.

The method may further comprise setting a weight for each row region or each column region.

Further, said setting a weight may include setting the weight such that one row and a next row having the same color of the row or column region have a ratio of 1:3 or 3:1.

Further, said setting a weight may include extracting illuminance information for row and column regions of the pixel unit; and setting the weight for each row region or each column region based on the extracted illuminance information.

The method may further include correcting a value of each pixel in the vertical binning image through comparison between a pixel value of the vertical binning image and a preset value, and the generating of the weight-based binning image may include using the vertical binning image generated through the correction and the horizontal binning image to generate the weight-based binning image.

Further, said correcting a value of each pixel may include comparing a pixel value of the vertical binning image with the preset value; correcting the pixel value of the vertical binning image by using a maximal pixel value of the pixel unit when the pixel value of the vertical binning image is equal to or greater than the preset value according to a result of the comparing; and maintaining the pixel value of the vertical binning image when the pixel value of the vertical binning image is smaller than the preset value according to the result of the comparing.

Further, said correcting the pixel value of the vertical binning image by using the maximal pixel value of the pixel unit may include correcting the pixel value of the vertical binning image based on an equation $((PWB\_org-M) \times 4$, where M denotes the maximal pixel value of the pixel unit and PWB_org denotes added pixel values of the vertical binning image)).

According to the present invention, a binning image is generated by generating a vertical binning image and a horizontal binning image based on a weight and then by composing the images, and thus resolution degradation due to a conventional binning technique can be prevented.

Further, a dynamic range can be expanded through linear correction after performing a weight-based binning operation.

DETAILED DESCRIPTION

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Hereinafter, embodiments of the present invention will be described in detail with reference to the accompanying drawings.

Here, the same reference numerals are assigned to the same or corresponding elements regardless of drawings signs.

Figure 1:
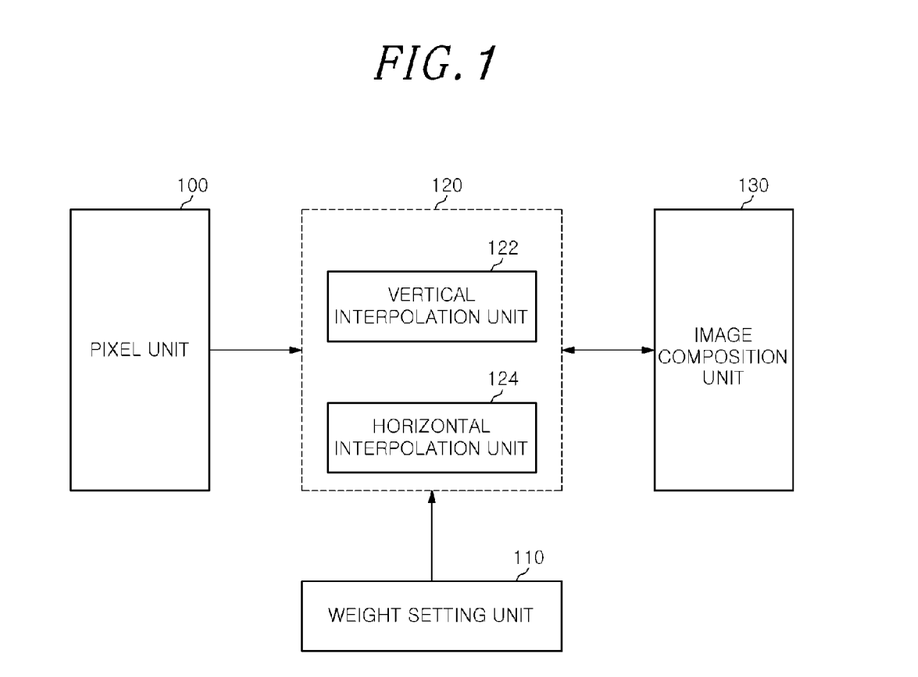
FIG. 1 is a block diagram illustrating an image sensor in accordance with an embodiment of the present invention.
Figure 2A:
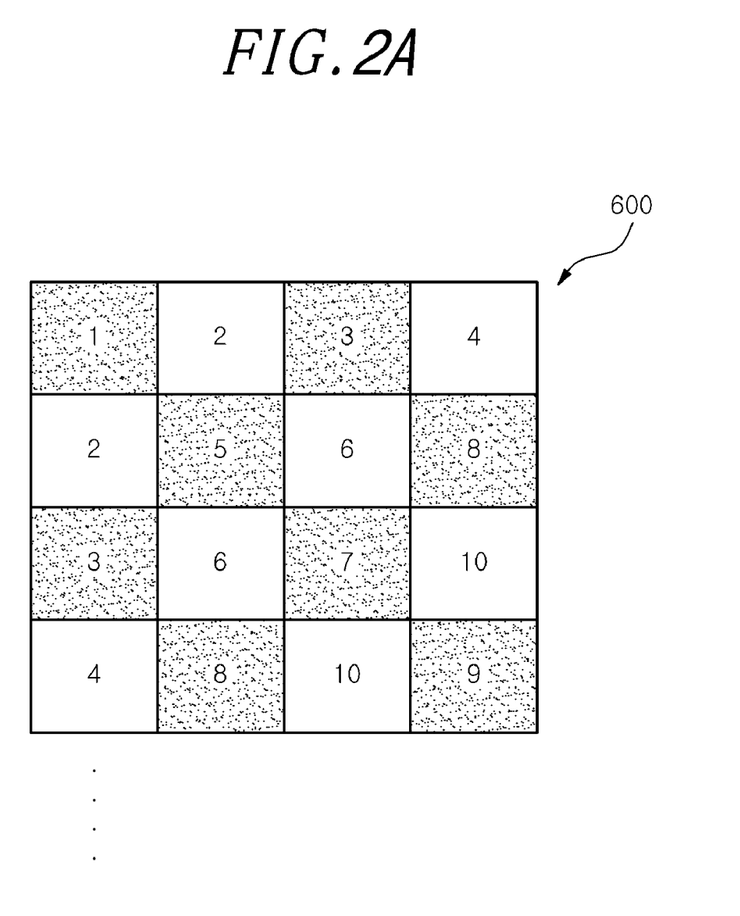
FIG. 2A is a diagram illustrating a bayer pattern used in the embodiment of the present invention.
Figure 2B:
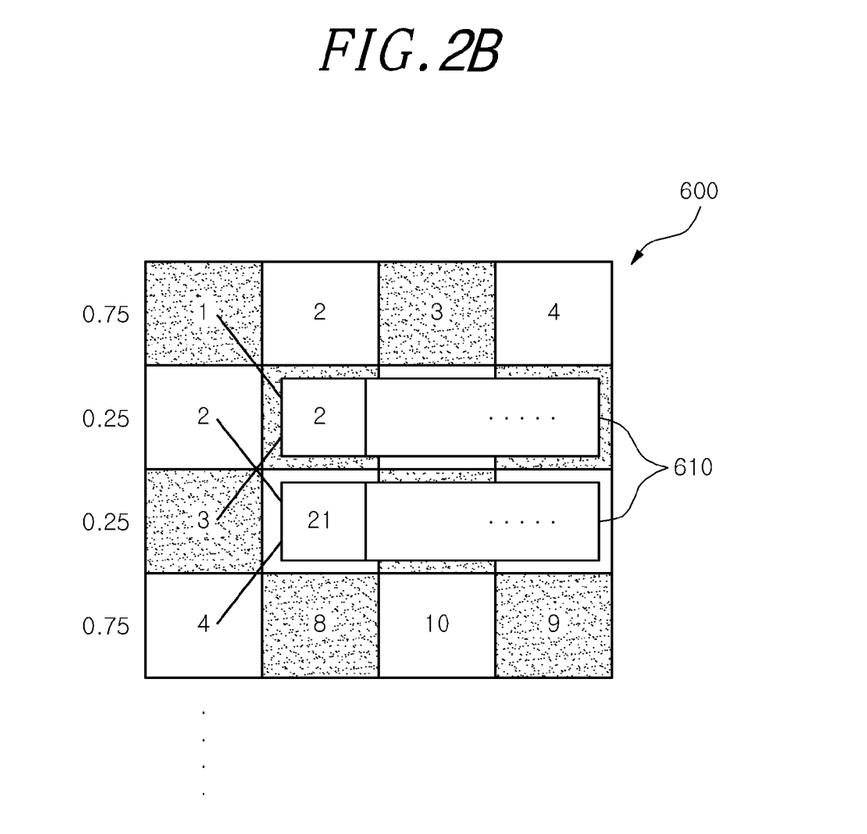
FIG. 2B is a diagram illustrating a vertical binning image in accordance with the embodiment of the present invention.
Figure 2C:
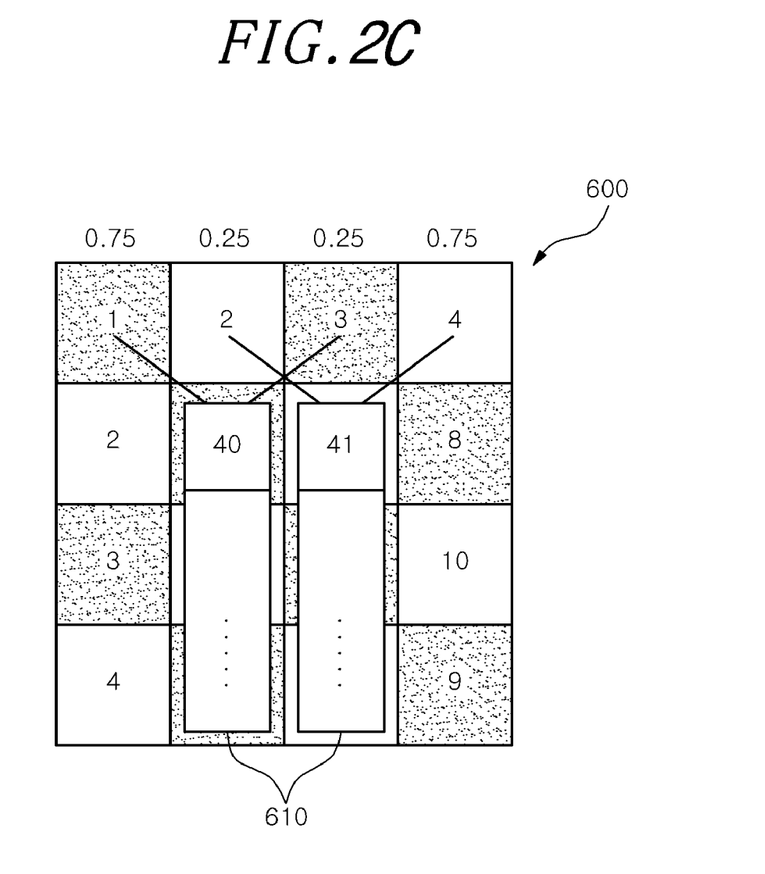
FIG. 2C is a diagram illustrating a horizontal binning image in accordance with the embodiment of the present invention.

FIG. 1 is a block diagram illustrating an image sensor in accordance with an embodiment of the present invention, FIG. 2A is a diagram illustrating a bayer pattern used in the embodiment of the present invention, FIG. 2B is a diagram illustrating a vertical binning image in accordance with the embodiment of the present invention, and FIG. 2C is a diagram illustrating a horizontal binning image in accordance with the embodiment of the present invention.

As illustrated in FIG. 1, the image sensor in accordance with the embodiment of the present invention may include a pixel unit 100, an interpolation unit 120, and an image composition unit 130. Here, the interpolation unit 120 may include a vertical interpolation unit 122 and a horizontal interpolation unit 124.

The pixel unit 100 may serve to output a signal of an optical subject inputted through a lens as an electrical signal. In the pixel unit 100, a bayer pattern that is advantageous in terms of resolution of the same subject is used and image data having one piece of color information are outputted from each pixel. For instance, image data having only an R component are outputted from a pixel corresponding to an R pattern, image data having only a G component are outputted from a pixel corresponding to a G pattern, and image data having only a B component are outputted from a pixel corresponding to a B pattern. FIG. 2A illustrates that image data having respectively only one color component are outputted corresponding to the bayer pattern. As a matter of course, an A/D conversion unit (not illustrated), which converts analog image data outputted from the pixel unit 100 into digital image data, is connected to the pixel unit 100. That is, the A/D conversion unit converts analog bayer image data outputted through the pixel unit 100 into digital bayer image data and transmits the digital bayer image data to the interpolation unit 120.

For instance, in the case where a plurality of pixel units 100 are arranged, each pixel unit 100 includes a single photodiode and a MOS transistor for reading charges accumulated in the photodiode. According to this pixel unit 100, in order to successively read images, a method of immediately reading images by exposing pixels for each column or each row is used.

A weight setting unit 110 provides an interface for setting a weight for each row or each column of the pixel unit 100, and may provide a weight set for each row to the interpolation unit 120. That is, the weight setting unit 110 may provide weight information for each row or column region of pixels, e.g. 1:3 or 3:1 weight information, to the interpolation unit 120.

The weight setting unit 110 may set a weight for each row or each column based on illuminance information.

The interpolation unit 120 receives a bayer pattern 600 as illustrated in FIG. 2A from the pixel unit 100, performs vertical and horizontal binning operations to the bayer pattern 600 based on the weight information set in the weight setting unit 110 to convert the pattern into vertical and horizontal binning images, and then outputs the binning images to the image composition unit 130. To this end, the interpolation unit 120 may include the vertical and horizontal interpolation units 122 and 124.

When the vertical interpolation unit 122 adds or averages two pixel values in a vertical direction on the base pattern 600 based on the weight information for each row region provided from the weight setting unit 110, the vertical interpolation unit 122 adds or averages the two pixel values by assigning different weights according to pixels of a row region. For instance, in the case where 3:1 (or 1:3) weight is assigned for rows having the same color and a row therebetween, a vertical binning image 610 as illustrated in FIG. 2B may be generated by adding or averaging values of vertical two pixels having the same color. This vertical binning image 610 is outputted to the image composition unit 130. In other words, 3:1 or 1:3 weight is assigned to pixel values outputted from vertical 77 and 78 having the same color in the bayer pattern 600 of FIG. 2A, and then one pixel is determined by adding or averaging the weighted pixel values. Further, 3:1 or 1:3 weight is assigned to pixel values of 78 and 79, and then the weighted values are added or averaged. In this manner, the vertical binning image 610 may be generated.

The horizontal interpolation unit 124 adds or averages two pixel values in a horizontal direction on the base pattern 600 based on the weight information for each column region provided from the weight setting unit 110 to thereby generate a horizontal binning image. For instance, in the case where 3:1 (or 1:3) weight is assigned for columns having the same color and a column therebetween, a vertical binning image 620 as illustrated in FIG. 2C may be generated by adding or averaging values of horizontal two pixels having the same color. This horizontal binning image 620 is outputted to the image composition unit 130. In other words, 3:1 or 1:3 weight is assigned to pixel values outputted from horizontal 77 and 78 having the same color in the bayer pattern 600 of FIG. 2A, and then one pixel is determined by adding or averaging the weighted pixel values. Further, 3:1 or 1:3 weight is assigned to pixel values of 78 and 79, and then the weighted values are added or averaged. In this manner, the horizontal binning image 620 may be generated.

The image composition unit 130 composes a vertical binning image and an horizontal binning image to output a weight-based binning image.

A process of generating a weight-based binning image by the above-described image sensor is described below.

The pixel unit 100 outputs the bayer pattern 600 as illustrated in FIG. 2A to the interpolation unit 120 in a state where exposure time is the same. In addition, the weight information set by the weight setting unit 110 is inputted to the interpolation unit 120. Here, a weight for a first row (column) region and a third row (column) region having the same color and a fifth row (column) region and a seventh row (column) region is 0:75:0.25, and a weight for a second row (column) region and a fourth row (column) region and a sixth row (column) region and an eighth row (column) region is 0.25:0.75.

Accordingly, the vertical interpolation unit 122 of the interpolation unit 120 adds or averages values of pixels having the same color in a vertical direction, based on the weight information for each row region, to thereby determine a pixel value of a vertical binning image. That is, the vertical interpolation unit 122 assigns a weight of 0.75 to first pixel 1 of the first row region of FIG. 2A and assigns a weight of 0.25 to first pixel 3 of the third row region, and then adds or averages the weighted values to thereby calculate a value of first pixel 20 of the vertical binning image 610 as illustrated in FIG. 2B. Further, the vertical interpolation unit 122 assigns a weight of 0.25 to first pixel 2 of the second row region and assigns a weight of 0.75 to first pixel 4 of the fourth row region to thereby calculate a value of first pixel 21 of the second row region of the vertical binning image. In this manner, a value of each pixel of the vertical binning image 610 may be calculated.

The horizontal interpolation unit 124 adds or averages values of pixels having the same color in a horizontal direction, based on the weight information for each column region, to thereby determine a pixel value of a horizontal binning image. That is, the horizontal interpolation unit 124 assigns a weight of 0.75 to first pixel 1 of the first column region of FIG. 2A and assigns a weight of 0.25 to first pixel 3 of the third column region, and then adds or averages the weighted values to thereby calculate a value of first pixel 40 of the horizontal binning image 620 as illustrated in FIG. 2C. In this manner, a value of each pixel of the horizontal binning image 620 may be calculated.

A weight-based binning image may be generated by composing the vertical and horizontal binning images 610 and 620 generated through the above-described process by the image composition unit 130.

Figure 3:
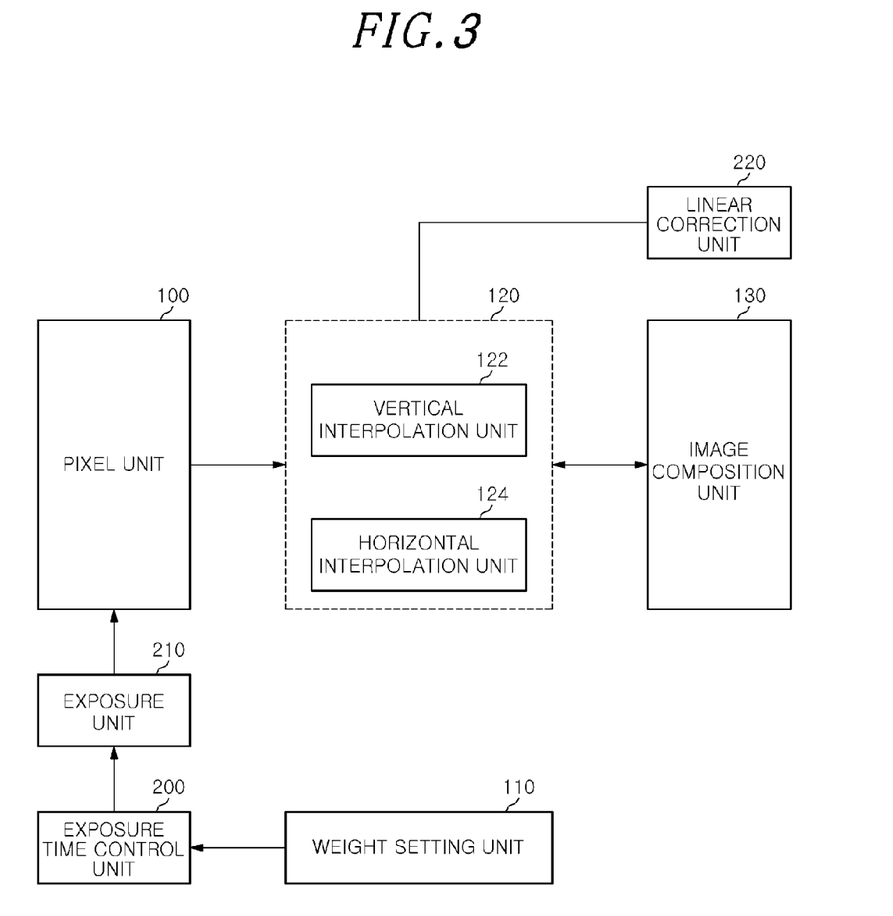
FIG. 3 is a block diagram illustrating an image sensor in accordance with another embodiment of the present invention.

FIG. 3 is a block diagram illustrating an image sensor in accordance with another embodiment of the present invention.

As illustrated in FIG. 3, the image sensor in accordance with the other embodiment of the present invention may include a pixel unit 100, a weight setting unit 110, an exposure time control unit 200, an exposure unit 210, an interpolation unit 120, and a linear correction unit 220.

The weight setting unit 110 provides an interface for setting a weight for each row or each column of the pixel unit 100, and may provide a weight set for each row to the exposure time control unit 200. That is, the weight setting unit 110 may provide weight information for each row or column region of pixels, e.g. 1:3 or 3:1 weight information, to the exposure time control unit 200.

The weight setting unit 110 may set a weight based on illuminance information for each row or each column, and may provide the set weight to the exposure time control unit 200.

The exposure time control unit 200 controls the exposure unit 210 such that different expose times are provided for each row or each column according to a weight. That is, the exposure time control unit 200 sets an exposure time value for each row or each column based on a weight provided from the weight setting unit 110, and then controls the exposure unit 210 based on the set exposure time value.

The exposure unit 210 adjusts exposure time for each row or each column according to control by the exposure time control unit 200. For instance, the exposure unit 210 may be shutter, but is not limited thereto.

Accordingly, the pixel unit 100 outputs bayer patterns having different exposure times to the interpolation unit 120.

The interpolation unit 120 may generate vertical and horizontal binning images by performing binning to different bayer patterns in vertical and horizontal directions. To this end, the interpolation unit 120 may include a vertical interpolation unit 122 and a horizontal interpolation unit 124.

The vertical interpolation unit 122 adds or averages values of two pixels in a vertical direction in different bayer patterns. That is, the vertical interpolation unit 122 may generate a vertical binning image by adding or averaging values of two pixels having the same color. This vertical binning image is outputted to the linear correction unit 220.

The linear correction unit 220 serves to obtain linearity for color processing, and performs a correction operation according to Equation 1 shown below.

$$PWB\_corr = PWB\_org \text{ (if } PWB\_org < 4M/3)$$

$$PWB\_corr = (PWB\_org - M)*4 \text{ (if } PWB\_org \geq 4M/3)$$

[Equation 1]

where PWB_org denotes a value of pixels added during a vertical binning process, M denotes a maximal value of an original pixel before binning is performed by the vertical interpolation unit 122, and PWB_corr denotes a pixel value corrected to have linearity. Here, M is 1023 when a pixel is a 10-bit pixel.

That is, the linear correction unit 220 maintains PWB_org that is a pixel value added during a vertical binning process if PWB_org is smaller than M/3. Otherwise, the linear correction unit 220 calculates corrected PWB_corr by using "(PWB_org−M)×4" in Equation 1.

The vertical binning image that has undergone a correction process in the linear correction unit 220 is inputted to the image composition unit 130 or the horizontal interpolation unit 124.

The horizontal interpolation unit 124 adds or averages values of two pixels in a horizontal direction in different bayer patterns. That is, the horizontal interpolation unit 124 may generate a horizontal binning image by adding or averaging values of two horizontal pixels having the same color. This horizontal binning image is outputted to the image composition unit 130.

The image composition unit 130 composes the corrected vertical binning image and horizontal binning image, and then outputs a result image.

A process of generating a weight-based binning image by the above-described image sensor is described below.

The exposure time control unit 200 outputs a control signal for controlling exposure time for each row region or each column region to the exposure unit 210 based on a weight set by the weight setting unit 110. Here, the weight setting unit 110 may extract illuminance information for the row and column regions of the pixel unit 100, and may set a weight for each row region or each column region based on the extracted illuminance information.

The exposure unit 210 controls exposure time for each row region or each column region based on the control signal, and accordingly, the pixel unit 100 outputs bayer patterns having different exposure times to the interpolation unit 120.

The vertical interpolation unit 122 of the interpolation unit 120 adds or averages values of pixels having the same color in a vertical direction in the different bayer patterns received from the pixel unit 100, to thereby determine a pixel value of a vertical binning image. This vertical binning image is inputted to the linear correction unit 220.

Thereafter, as shown in Equation 1, the linear correction unit 220 maintains PWB_org that is a pixel value added during a vertical binning process if PWB_org is smaller than M/3. Otherwise, the linear correction unit 220 calculates corrected PWB_corr by using "(PWB_org−M)×4" in Equation 1, and then corrects a value of PWB_org by using the calculated PWB_corr. Through this correction process, the linear correction unit 220 outputs the corrected horizontal binning image to the image composition unit 130.

The horizontal interpolation unit 124 adds or averages values of pixels having the same color in a horizontal direction in the different bayer patterns received from the pixel unit 100, to thereby determine a pixel value of a vertical binning image. In this manner, the horizontal interpolation unit 124 generates a vertical binning image, and then outputs the vertical binning image to the image composition unit 130.

A weight-based binning image may be generated by composing the vertical and horizontal binning images generated through the above-described process by the image composition unit 130.

Further, by securing linearity through the correction process after performing the vertical binning process, a dynamic range may be increased by three times or more.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An image sensor, comprising:
   a) a pixel unit configured to output a bayer pattern by converting an optical signal of a subject into an electrical signal;
   b) a weight setting unit configured to set first weight information for a first row region and second weight information for a second row region at a first predetermined ratio, and third weight information for a first column region and fourth weight information for a second column region at a second predetermined ratio, wherein the first weight information, the second weight information, the third weight information, and the fourth weight information are based on extracted illuminance information;
   c) a vertical interpolation unit configured to generate a vertical binning image by adding or averaging values of vertical pixels of the bayer pattern based on the first and second weight information for the first and second row regions of the bayer pattern, respectively;
   d) a horizontal interpolation unit configured to generate a horizontal binning image by adding or averaging values of horizontal pixels of the bayer pattern based on the third and fourth weight information for the first and second column regions of the bayer pattern, respectively; and
   e) an image composition unit configured to generate a weight-based binning image by composing the vertical and horizontal binning images.

2. The image sensor of claim 1, wherein, in the bayer pattern of the pixel unit, red pixels and green pixels are alternately arranged in one row, and blue pixels and green pixels are alternately arranged in a next row.

3. The image sensor of claim 2, wherein the weight setting unit is configured to provide an interface for setting the first and second weight information for each row region and each column region of the bayer pattern, respectively, and provide the first and second weight information through the interface to the vertical and horizontal interpolation units, respectively.

4. The image sensor of claim 3, wherein the first predetermined ratio is 1:3 or 3:1.

5. The image sensor of claim 4, wherein the second predetermined ratio is 1:3 or 3:1.

6. The image sensor of claim 1, wherein the first and second predetermined ratios are the same.

7. The image sensor of claim 1, wherein the first and second predetermined ratios are different.

* * * * *